United States Patent
Li et al.

(10) Patent No.: US 11,595,714 B2
(45) Date of Patent: Feb. 28, 2023

(54) NET-AWARE SERVICE TO CONTROL MEDIA DISTRIBUTION NODE OUTPUT

(71) Applicant: OpenTV, Inc., San Francisco, CA (US)

(72) Inventors: Lianghe Li, Beijing (CN); Kewei Chen, Beijing (CN); Hengxing Xiao, Beijing (CN); Limin Guo, Beijing (CN); Henry Tan, Mountain View, CA (US); Nithin Rudraswamy, Bangalore (IN); Digvijay Singh Chauhan, Bangalore (IN)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 16/957,198

(22) PCT Filed: Dec. 28, 2017

(86) PCT No.: PCT/CN2017/119415
§ 371 (c)(1),
(2) Date: Jun. 23, 2020

(87) PCT Pub. No.: WO2019/127221
PCT Pub. Date: Jul. 4, 2019

(65) Prior Publication Data
US 2021/0092469 A1    Mar. 25, 2021

(51) Int. Cl.
*H04N 21/266* (2011.01)
*H04N 21/6338* (2011.01)
*H04N 21/647* (2011.01)

(52) U.S. Cl.
CPC ....... *H04N 21/266* (2013.01); *H04N 21/6338* (2013.01); *H04N 21/64738* (2013.01)

(58) Field of Classification Search
CPC ........... H04N 21/64738; H04N 21/266; H04N 21/6338
See application file for complete search history.

(56) References Cited

U.S. PATENT DOCUMENTS

2002/0186259 A1   12/2002  Meandzija et al.
2008/0310550 A1*  12/2008  Miller ............... H04L 1/22
                                              375/299

(Continued)

FOREIGN PATENT DOCUMENTS

CN       1613254 A        5/2005
WO       WO 0203255 A2    1/2002
WO       WO 2019/127221 A1 7/2019

OTHER PUBLICATIONS

International Search Report and Written Opinion dated Nov. 29, 2018 for International PCT Application No. PCT/CN2017/119415; 8 pages.

*Primary Examiner* — Joshua D Taylor
(74) *Attorney, Agent, or Firm* — Polsinelli LLP (57) ABSTRACT

A method includes receiving a first control command including a value for a first control parameter. The method further includes determining an association between the first control command and an identifier of the first control parameter. The method also includes identifying a graphical user interface (GUI) tool and information of the GUI tool based on the identifier of the first control parameter. The method includes launching a GUI that includes the GUI tool. The method further includes updating the first control parameter using the GUI tool based on the information of the GUI tool and the value for the first control parameter. The method also includes initiating content streaming using a first modulator in response to updating the first control parameter. The method includes identifying performance data for the first modulator associated with the content streaming. The method further includes sending the performance data to a server via the network.

20 Claims, 6 Drawing Sheets

(56) References Cited

U.S. PATENT DOCUMENTS

2009/0037950 A1* 2/2009 Ching ................ H04N 21/2181
725/36
2016/0162454 A1 6/2016 Bargagni et al.
2016/0313807 A1* 10/2016 Shin .......................... G06F 3/14
2017/0026714 A1* 1/2017 Conan .............. H04N 21/42204

* cited by examiner

NET-AWARE SERVICE TO CONTROL MEDIA DISTRIBUTION NODE OUTPUT

CROSS-REFERENCES TO RELATED APPLICATIONS

This application is a U.S. National Stage of PCT Application No. PCT/CN2017/119415, filed Dec. 28, 2017, which is hereby incorporated by reference in its entirety for all purposes.

FIELD

The embodiments discussed herein are related to a net-aware service to control media distribution node output.

BACKGROUND

Content delivery platforms typically use multiple media distribution servers to provide content over a network. The media distribution servers may include one or more modulators that may transform a signal into a different form, such as digital to analog, prior to transmission of the signal to another device over a network. Despite being part of the same content delivery platform, the media distribution servers may use different hardware, which can cause issues in their ability to provide the content.

The subject matter claimed herein is not limited to embodiments that solve any disadvantages or that operate only in environments such as those described above. Rather, this background is only provided to illustrate one example technology area where some embodiments described herein may be practiced. Further, unless otherwise indicated, the materials described in the background section are not prior art to the claims in the present application and are not admitted to be prior art by inclusion in this section.

BRIEF DESCRIPTION OF THE DRAWINGS

Example embodiments will be described and explained with additional specificity and detail through the use of the accompanying drawings in which.

DETAILED DESCRIPTION OF THE DRAWINGS

Media distribution nodes may include multiple modulators. Often, a single media distribution node may include modulators of different makes and/or models. These modulators, however, often differ in their operation, such as by having different formatting, control syntax, output options, etc. In most instances, to remotely interface with a modulator over a network, a control device may use specific application programming interfaces (APIs) that are specific to each modulator or specific to a small number of modulators.

When a hardware modulator is replaced by a different hardware modulator, various tests may be performed to verify that the newly installed modulator outputs media content that meets objective industry standards. Similarly, when applying an update, such as a firmware update or a software update, to an existing modulator, the same or similar tests may be performed on the updated modulator. Because of the disparate nature of conventional modulator technology, configuring the modulator, conducting tests, and controlling ongoing operations is typically done on a per-modulator basis. For systems with multiple modulators, operating on a per-modulator basis may be increasingly difficult due to current technological constraints, such as bandwidth and processing ability. This problem may be amplified in systems with multiple media distribution nodes, each having multiple modulators.

Aspects of the present disclosure address these and other shortcomings of conventional media distribution nodes by providing a net-aware service to control media distribution node output. An example system may use a single set of control commands for modulators in the system, even for modulators of a different make and/or model. The control commands may be received by a graphical user interface (GUI) controller at each media distribution node. Each media distribution node may include one or more modulator utilities that were designed specifically for a particular modulator, or a small group of modulators. The GUI controller may interpret the control commands and use the control commands to manipulate a modulator utility GUI at the media distribution node.

An example system may include a memory, a first modulator, and one or more processors operatively coupled to the memory and the first modulator. The one or more processors may be configured to receive, via a network, a first control command including a value for a first control parameter. The one or more processors may be configured to determine an association between the first control command and an identifier of the first control parameter. The one or more processors may be configured to identify a graphical user interface (GUI) tool and information of the GUI tool in a data storage based on the identifier of the first control parameter. The one or more processors may be configured to launch a GUI that includes the GUI tool. The one or more processors may be configured to update the first control parameter using the GUI tool based on the information of the GUI tool and the value for the first control parameter. The one or more processors may be configured to initiate content streaming using the first modulator in response to updating the first control parameter. The one or more processors may be configured to identify performance data for the first modulator associated with the content streaming. The one or more processors may be configured to send the performance data to a server via the network.

Embodiments of the present disclosure may provide improvements to computer-based content delivery systems, such as by providing new technology-based approaches to controlling modulator operations at a content delivery node. The techniques described herein may use fewer data transmissions to control modulators and thus, may reduce overall bandwidth consumption related to modulator control communications. In some instances, an active remote connection between the control device and the media distribution node may not be needed for the media distribution node to control the modulator. Further, the present disclosure provides a unified set of commands that may be used by the control device to manage operations for any number of modulators, even modulators of different makes and/or models. Moreover, embodiments of the present disclosure may simplify a testing or validation process for newly installed or updated modulators by providing the unified set of commands for testing or validation.

As used in the present disclosure, "media content" may refer to durational media content in electronic format with a start and a finish. Example media content may include videos, movies, television programs, advertisements, audiobooks, audio programs, music, test streams for various software testing, etc.

Embodiments of the present disclosure are explained with reference to the accompanying drawings.

Figure 1:
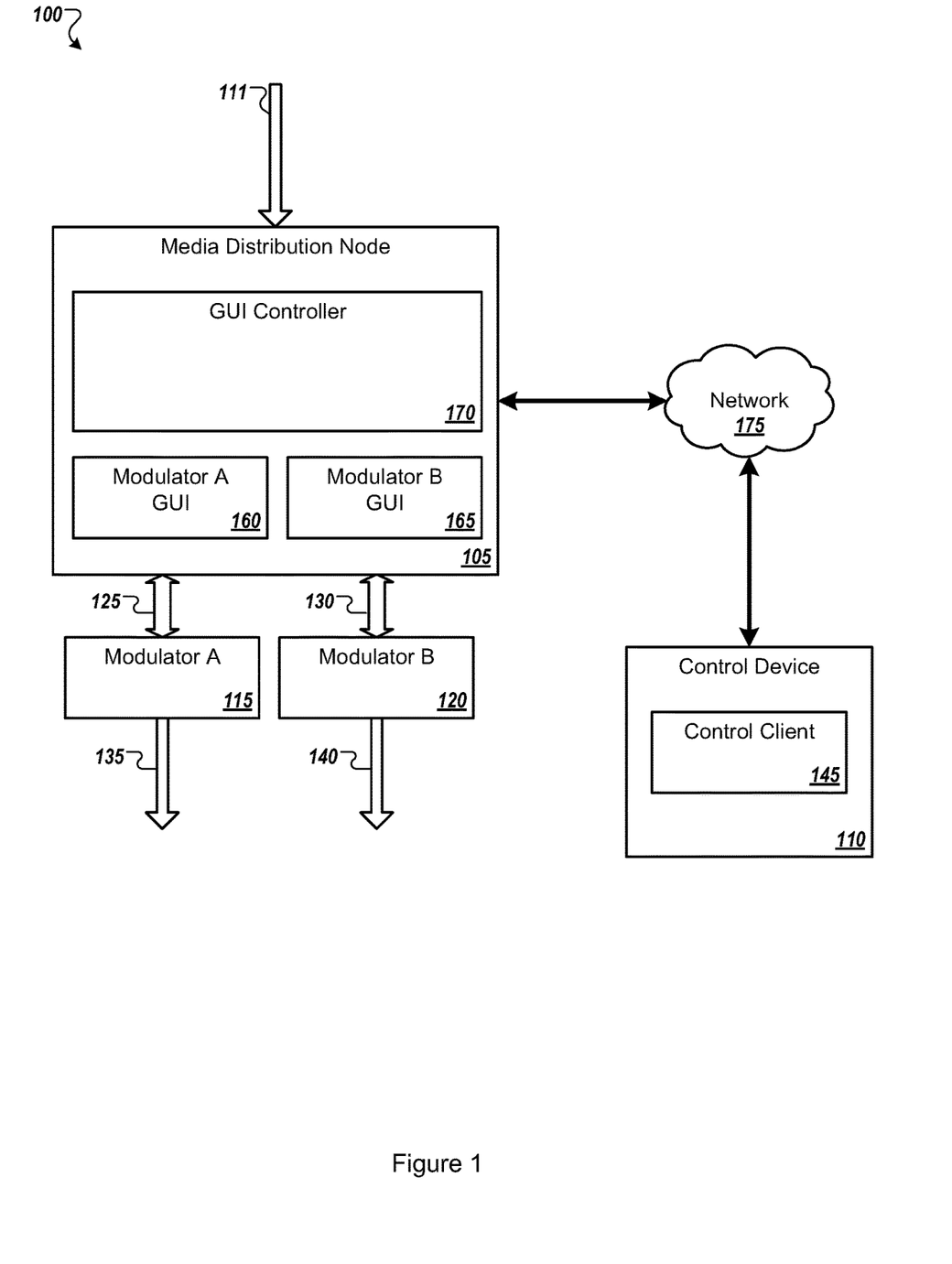
FIG. 1 is a block diagram of an example operating environment in which some embodiments may be implemented.

FIG. 1 illustrates a block diagram of an example operating environment 100 in which some embodiments may be implemented, arranged in accordance with at least one embodiment described herein. The example operating environment 100 may include a media distribution node 105 and a control device 110, which may be communicatively coupled via a network 175. The operating environment may include a test environment where various components may be tested or a production environment.

The media distribution node 105 may operate to receive, encode, packetize, multiplex, modulate, and broadcast data of various types from various sources to one or more destination devices (not illustrated in FIG. 1). For example, the media distribution node 105 may receive media content 111 from one or more content providers. The media distribution node 105 may include one or more servers. For example, the media distribution node 105 may include one or more computing devices, (such as a rackmount server, a router computer, a server computer, a personal computer, a mainframe computer, a laptop computer, a web server, a proxy server, a desktop computer, a headend, etc.), data stores (e.g., hard disks, memories, databases), networks, software components, and/or hardware components. In various embodiments, the media distribution node 105 may be implemented as a cable headend, a satellite headend, and/or a streaming server, etc. The media distribution node 105 may broadcast the media content to one or more client devices, which may include mobile devices, set-top boxes (STB), desktop computers, laptop computers, tablet computers, smartphones, personal digital assistants (PDAs), or other suitable computing devices. In at least some embodiments, the media distribution node 105 may send the data to other nodes, and the other nodes may send the data to one or more client devices.

The media distribution node 105 may include or be coupled to one or more modulators, such as via Ethernet, Peripheral Component Interconnect (PCI), PCI-Express, or any other type of connection. The one or more modulators may use a passband modulation technique prior to distribution of the data to the one or more destination devices. In at least some embodiments, the one or more modulators may perform analog modulation and/or digital modulation. For example, the one or more modulators may use a quadrature phase shift keying (QPSK) modulation technique, which may refer to a digital frequency modulation technique that may be used for communicating data over coaxial cable networking facilities. The one or more modulators may also use a quadrature amplitude (QAM) modulation technique, which may refer to a digital or analog amplitude modulation technique that may be used for communicating data over wireless networking components. The one or more modulators may also use a quadrature amplitude (OFDM) modulation technique or multi-level vestigial sideband modulation (VSB), such as 8 VSB or 16 VSB. The one or more modulators may be configured to generate an output in any format, such as Advanced Television System Committee (ATSC), China Mobile Multimedia Broadcasting (CMMB), Digital Terrestrial Multimedia Broadcast-Terrestrial/Handheld (DTMB-T/H), Digital Video Broadcasting (DVB), DVB Standard for Modulation Appropriate for Cable Networks (DVB-C), DVB Standard for Modulation Appropriate for Cable Networks 2 (DVB-C2), Standard for Modulation Appropriate for Terrestrial/Handheld Network (DVB-T/H), DVB Standard for Second Generation Modulation Appropriate for Terrestrial Networks (DVB-T2), Integrated Services Digital Broadcasting-Terrestrial (ISDB-T), QAM-A, QAM-B, etc.

As illustrated, the media distribution node 105 may be coupled to a modulator A 115 and a modulator B 120. Modulator A 115 and modulator B 120 may be a same make and a same model. In at least some embodiments, Modulator A 115 and modulator B 120 may be a same make and a different model. In at least some embodiments, Modulator A 115 and modulator B 120 may be a different make and a different model.

In an example, the media distribution node 105 may receive the media content 111 from a media content source. The media content 111 may include an electronic file that may be executed or loaded using software, firmware or hardware configured to present the media content 111 at a client device (not illustrated in FIG. 1). The media distribution node 105 may receive the media content 111 from any source, such as from an over-the-air broadcaster, satellite, cable, a media server, a streaming device, or from any other source capable of sending content items to the media distribution node 105.

The media distribution node 105 may use either modulator A 115 or modulator B 120, or both, to generate an output for other devices based on the media content 111. In a specific example, the media distribution node 105 may send the media content 111 via link 125 to modulator A 115. The modulator A 115 may modulate the media content 111 and may output the modulated media content to another device via link 135. Additionally or alternatively, the media distribution node 105 may send the media content 111 via link 130 to modulator B 120. The modulator B 120 may modulate the media content 111 and may output the modulated media content to another device via link 140.

Figure 2:
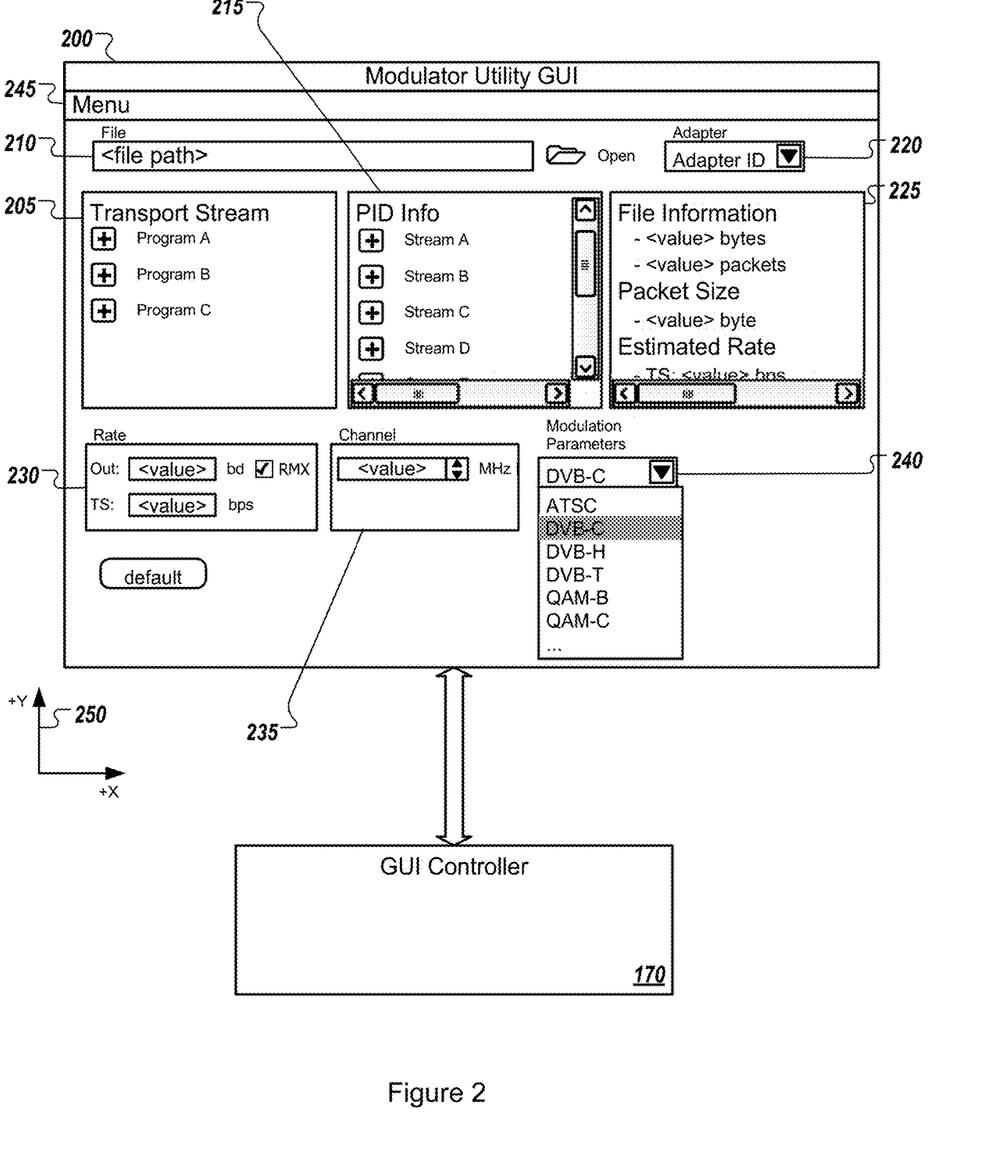
FIG. 2 illustrates an example modulator utility GUI.

In at least some embodiments, one or more modulator utilities may be installed at the media distribution node 105. A modulator utility may include a graphical user interface (GUI). An example modulator utility GUI for a modulator utility is illustrated in FIG. 2. The modulator utility GUI may include one or more GUI tools that may be used to adjust control parameters for a modulator. For example, the modulator utility GUI may include a GUI tool to select between different adapters (e.g., modulators) that are connected to the media distribution node 105. Once a modulator is selected, that modulator may be controlled by the modulator utility GUI. Additional GUI tools may include GUI tools to select a file (e.g., media content 111), select a transport stream, select a program within the file and/or transport stream, obtain information about a file, transport stream and/or a program, select a playback or output rate, select a channel, select modulation parameters (e.g., ASTC, DVB, QAM, etc.), among others. Further details on GUI tools are additionally described in conjunction with FIG. 2.

A first utility may be installed at the media distribution node 105. The first utility may provide a modulator A GUI 160. The modulator A GUI 160 may be used to control modulator A 115. A second utility may be installed at the media distribution node 105. The second utility may provide a modulator B GUI 165. The modulator B GUI 165 may be used to control modulator B 120. In some embodiments, modulator A GUI 160 may be used to control modulator B 120. In some embodiments, modulator B GUI 165 may be used to control modulator A 115. In some embodiments, modulator A GUI 160 may be used to control both modulator A 115 and modulator B 120. In some embodiments, modulator B GUI 165 may be used to control modulator A 115 and modulator B 120.

The media distribution node 105 may be communicatively coupled to the control device 110 via the network 175. In general, the network 175 may include one or more wide area networks (WANs) and/or local area networks (LANs) that enable the media distribution node 105 and control device 110 to communicate with each other. In some embodiments, the network 175 includes the Internet, including a global internetwork formed by logical and physical connections between multiple WANs and/or LANs. Alternatively or additionally, the network 175 may include one or more cellular RF networks and/or one or more wired and/or wireless networks such as, but not limited to, 802.xx networks, Bluetooth access points, wireless access points, Long Term Evolution (LTE) or LTE-Advanced networks, IP-based networks, or the like. The network 175 may also include servers that enable one type of network to interface with another type of network.

The control device 110 may include a computing device which may include, but is not limited to, a server, a thin client, a desktop computer, a laptop computer, a tablet computer, a mobile phone, a smartphone, a personal digital assistant (PDA), or other suitable computing device.

The control device 110 may include a control client 145 that may manage operations at the media distribution node 105. For example, the control client 145 may control operation of the modulator A GUI 160 and the modulator B GUI 165. In at least one embodiment, the control client 145 may be implemented using hardware including a field-programmable gate array ("FPGA") or an application-specific integrated circuit ("ASIC"). In some other embodiments, the control client 145 may be implemented using a combination of hardware and software. The control client 145 may include an application (or part of an application) on the control device 110. For example, the application may include a web browser. As a web browser, the application may also access, retrieve, present, and/or navigate content (e.g., web pages such as Hyper Text Markup Language (HTML) pages, digital media items, etc.) served by a web server. The application may render, display, and/or present an interface by which a system administrator may provide input to generate or select control commands, and input to send the control commands to the media distribution node 105. In another example, the application may include a standalone application (e.g., a mobile application or mobile app) that allows users to monitor and/or control operations at the media distribution node 105.

To control the one or more modulators at the media distribution node 105, the control client 145 may generate a set of control commands for use by a GUI controller 170 at the media distribution node 105. The control client 145 may be physically located anywhere, and may send the one or more control commands to the GUI controller 170 from anywhere or from any device that is connected to the media distribution node 105 via the network 175. In at least some embodiments, the control client 145 may use a single set of control commands to control modulator A 115 and modulator B 120, even when modulator A 115 and modulator B 120 are different models and/or makes. In at least some embodiments, the single set of control commands may include a set of universal control commands that may be sent to the GUI controller 170 to control any modulator of any make, model, or type.

The GUI controller 170 may directly control one or more modulators utility GUIs associated with one or more modulator utilities. In at least some embodiments, the GUI controller 170 may directly control modulator A 115 and modulator B 120 via their respective utility GUIs—modulator A GUI 160 and modulator B GUI 165. For example, the GUI controller 170 may listen for control commands from the control client 145, such as by exposing or listening on a port for a Hypertext Transmission Protocol (HTTP) transmission. In at least some embodiments, the GUI controller 170 may use Representational state transfer (REST) or RESTful services to listen for the HTTP transmission. The GUI controller 170 may execute the control commands using the modulator A GUI 160 and/or modulator B GUI 165.

For example, the control client 145 may generate a control command to initiate a test stream based on a set of control parameters. The set of control parameters, for example, may include an identification of the test stream, a particular modulator, and one or more modulation parameters (e.g., DVB-C). The control client 145 may generate a control command with these control parameters and may send the control command to the media distribution node 105, such as on or via a port to which the GUI controller 170 may be listening. The GUI controller 170 may receive the control command, such as by listening for the commands on a port. For example, the control command may indicate that the GUI controller 170 is to initiate the test stream using modulator A 115. The GUI controller 170 may launch a utility for modulator A 115, which in this example may include the modulator A GUI 160. The GUI controller 170 may adjust various GUI tools on the modulator A GUI 160 according to the received control command and control parameters. For example, the GUI controller 170 may select the modulator A 115 using an adapter selection GUI tool. The GUI controller 170 may also select the modulation parameter "DVB-C" using a modulation parameter selection GUI tool on the modulator A GUI 160. The GUI controller 170 may also select and/or open a file, using a file selection GUI tool, to be used for the test stream. The GUI controller 170 may also select a program, a stream, etc. using similar techniques.

To manipulate the various GUI tools on the utility, the GUI controller 170 may access a map (which may include a translation table) of the modulator utility GUI that may include information of various GUI tools that may describe the various GUI tools, control parameters associated with the various GUI tools, instructions on how to operate the GUI tool, and a spatial location of the GUI tool on the GUI, etc. The spatial location may include a set of coordinates on the GUI where the GUI tool may be located. In an example, the map may indicate the existence of a modulation parameter selection GUI tool on the GUI, a spatial location of the modulation parameter selection GUI tool, and a set of control parameters that may be available using the modulation parameter selection GUI tool. The set of control parameters available using the modulation parameter selection GUI tool, for example, may include ASTC, DVB-C, DVB-H, DVB-T, QAM-B, QAM-C, etc. In at least some embodiments, the GUI controller 170 may generate the map, as further described in conjunction with FIG. 2. In response to the GUI controller 170 receiving a control command to initiate a stream, the GUI controller 170 may access the map to identify information about various GUI tools that may be available.

In an example, the control command may include a set of control parameters associated with the stream, such as a particular program, stream, playback or output rate, channel, adapter and modulation parameters. The map may include information about the GUI tools that may be used to set each of these control parameters. For each of the control parameters, the GUI controller 170 may identify a spatial location of the GUI tool. The GUI controller 170 may use the spatial location to set the control parameters using the GUI tools. For example, the GUI controller 170 may use a command line interface to manipulate a cursor (or to mimic a cursor) to navigate to the spatial location on the GUI where a particular GUI tool may be located. The GUI controller 170 may activate the GUI tool, such as by activating a button, text box, drop down menu, a mouse click, a simulated mouse click, or other GUI tool. The GUI controller 170 may then set the control parameter using the GUI tool. For example, the control parameter for the stream may be to set a modulation parameter to DVB-C. The GUI controller 170 may navigate to the "Modulation Parameters" GUI tool on the GUI, activate a drop down menu, and select "DVB-C" from the drop down menu, as illustrated in FIG. 2. The GUI controller 170 may set any number of control parameters.

In at least some embodiments, the control command may be part of a set of control commands that may be universally used for different modulators of different make, model, or type. In these and other embodiments, the map may include a translation table between the syntax of the control commands and the control parameters, such as a translation table 500 as further described in conjunction with FIG. 5. For example, a control command in the single set of control commands may include a command to set a Modulation Parameter to DVB-C. A syntax used in a first utility may match the syntax of the control command syntax, namely, the first utility may include a GUI tool labeled as "Modulation Parameter." A syntax used in a second utility may not match the syntax of the control command syntax, but may have the same or similar function. For example, to adjust the stream output to be in a DVB-C format, the GUI tool on the second utility may be called "TS Output Control." The translation table may include a relationship between the syntax used in the control commands (e.g., Modulation Parameter) and the syntax used within the utilities (e.g., TS Output Control). In these and other embodiments, the GUI controller 170 may use the control command to identify the corresponding syntax for the particular GUI tool, such as by using the control command as a key in a data record for a particular make or manufacturer of a modulator to identify the corresponding syntax for the particular GUI tool.

Once the GUI controller 170 has set the control parameters using the various GUI tools, the GUI controller 170 may initiate the stream. In an example, the stream may be handled by modulator A 115, which may generate an output stream. The output stream may include an internal test stream, an external media content stream, etc. In at least some embodiments, the media distribution node 105 may monitor the output stream to identify performance data for the output stream and/or modulator A 115 when modulating the output stream. In at least some embodiments, the modulator A 115 may send the output stream to one or more destination devices via the link 135. The media distribution node 105 may send the performance data to another device, such as the control device 110 or another device.

In at least some embodiments, the control device 110 may perform resource allocation through monitoring of the modulators 115, 120. For example, the control device 110 may monitor resource usage of the modulators 115, 120 and update configuration settings or switch between modulators 115, 120 based on the monitoring. In at least some embodiments, the control device 110 may identify various parameters and information related to the modulators 115, 120, such as a capability of each modulator, various modulator functionality, etc. Using this various parameters and information related to the modulators 115, 120, the control device 110 may adjust the control parameters.

In at least some embodiments, a modulator utility may be vendor-specific, such that a single modulator utility may be used to control different modulator models of the same make. In these and other embodiments, any number of modulators of the same make may be controlled by a single modulator utility. Alternatively or additionally, a single modulator utility may be used to control modulators of different makes.

Modifications, additions, or omissions may be made to the example operating environment 100 without departing from the scope of the present disclosure. Specifically, embodiments of the example operating environment 100 are depicted in FIG. 1 as including one media distribution node 105, one control device 110, two modulators 115, 120, one control client 145, one network 175, two modulator GUIs 160, 165 and one GUI controller 170. However, the present disclosure applies to an example operating environment 100 including any number of these devices.

Moreover, the separation of various components in the embodiments described herein is not meant to indicate that the separation occurs in all embodiments. Additionally, it may be understood with the benefit of this disclosure that the described components may be integrated together in a single component or separated into multiple components.

FIG. 2 illustrates an example modulator utility GUI 200 that may be controlled by the GUI controller 170. The modulator utility GUI 200 may include any number of GUI tools, including any number of nested GUI tools. The GUI tools may include any type of GUI tool, such as a text box, a check box, a radio button, an expandable menu, a drop down menu, a scroll bar, a pop-up window activator, a selection tool, an increase button, a decrease button, etc. As illustrated, the modulator utility GUI 200 includes a transport stream GUI tool 205, a file selection GUI tool 210, a program identification GUI tool 215, an adapter selection GUI tool 220, a file information GUI tool 225, a playback rate GUI tool 230, a channel frequency selection GUI tool 235, and a modulation parameter selection GUI tool 240. The modulator utility GUI 200 may include more or fewer GUI tools.

The transport stream GUI tool 205 may include an identifier of a transport stream based on a selected file (e.g., media content 111), any number of programs associated with the transport stream, a program name and total bitrate for each program in the transport stream, a stream type, a stream identifier, etc. As illustrated, information for each program in the transport stream is collapsed and may be expanded by a selection of the expandable "+" GUI tool.

The file selection GUI tool 210 may be used to select a file to use for streaming. The file selection GUI tool 210 may display the filename of the selected file and a full path of the selected file.

The program identification GUI tool 215 may include a program identifier, a bitrate of the program, a scrambled state of the transport stream, a stream identifier, etc.

The adapter selection GUI tool 220 may include a GUI tool to select a modulator from any number of available modulators. The adapter selection GUI tool 220 may indicate the selected modulator and, in some embodiments, the adapter selection GUI tool 220 may display the port associated with the selected modulator.

The file information GUI tool 225 may include a file name, file size, number of packets in the file, packet size, estimated rate for the transport stream, etc.

The playback rate GUI tool 230 may include an output rate GUI tool that may be configured to receive input to change the output rate of the playback of the stream. The playback rate GUI tool 230 may also include a transport stream rate, which may display a transport stream rate of the file. The playback rate GUI tool 230 may further include a selectable remux tool ("RMX") that causes the respective modulator to remux the transport stream to match a channel output rate (which may be the same channel output rate selected using the channel frequency selection GUI tool 235). The playback rate GUI tool 230 may include a default button that may be used to restore a default output rate.

The channel frequency selection GUI tool 235 may include a text box configured to receive channel frequency input.

The modulation parameter selection GUI tool 240 may permit the selection of various modulation parameters, such as bandwidth selection, time interleaver selection, constellation mode, guard interval, code rate, frame numbering selection, modulation mode selection (e.g., 8VSB, 16VSB, 16-QAM, 32-QAM, 64-QAM, 128-QAM, 256-QAM), number of taps for sideband filters selection, in-depth interleaver selection, enable cell identifier selection, enable E48, S49 selection, S48 time slicing selection, S49-MPE-FEC selection, or any other modulation parameter that may be selectable or adjustable using a modulator utility.

Other control parameters that are not illustrated in FIG. 2 may include a packet size selection GUI tool, DVB-ASI settings GUI tool (such as burst mode or invert DVB-ASI), among others.

In at least some embodiments, the GUI controller 170 may generate a map (which may include a translation table) of the modulator utility GUI 200 and the GUI tools available on the modulator utility GUI 200. The map may be used by the GUI controller 170 to control one or more modulators, such as modulator A 115 and/or modulator B 120 of FIG. 1. In one or more embodiments, to generate the map of the modulator utility GUI 200, the GUI controller 170 may install the utility at the media distribution node 105.

In at least some embodiments, once the utility has been installed, the GUI controller 170 may launch the utility. When launched, the utility may generate the modulator utility GUI 200. The GUI controller 170 may parse or search the modulator utility GUI 200 for control parameters. In at least some embodiments, the GUI controller 170 may perform a character recognition analysis to identify the control parameters. The GUI controller 170 may scan the modulator utility GUI 200 to identify keywords indicative of a control parameter. For example, the GUI controller 170 may scan the modulator utility GUI 200 and may identify the words "Modulation Parameters." Alternatively or additionally, the GUI controller 170 may query the utility for available commands to identify the keywords or check an application programming interface (API) for an index of available commands. The GUI controller 170 may identify and scan an area of the GUI surrounding the words "Modulation Parameters" for a GUI tool. As illustrated, the GUI controller 170 may identify a drop down menu 240 near the words "Modulation Parameters." The GUI controller 170 may identify information of the GUI tool, such as a type of GUI tool (e.g., drop down menu), available selectable options (e.g., ATSC, DVB-C, DVB-H, DVB-T, QAM-B, QAM-C), how to operate the GUI tool (e.g., click the drop down menu, select an option), a spatial location of the GUI tool, etc. The GUI controller 170 may identify the spatial location for the GUI tool, such as by using a coordinate system 250. The spatial location may include an (x, y) coordinate in the coordinate system 250, for example, or a range of coordinates. The GUI controller 170 may store the GUI tool information (e.g., the identified words, the GUI tool type, the available selectable options, how to operate the GUI tool, the spatial location of the GUI tool, etc.) in a data storage. The GUI controller 170 may also store an identifier of a control command in association with particular GUI tool information. For example, the GUI controller 170 may store an identifier of a modulation control command in association with the "Modulation Parameters" GUI tool. As a result, in response to the GUI controller 170 receiving the modulation control command, the GUI controller 170 may identify the respective GUI tool in the data storage and how to execute the modulation control command.

In at least some embodiments, the GUI controller 170 may use a syntax of discovered control parameters to identify an adapter. For example, the GUI controller 170 may identify a particular control parameter and check the control parameter in a database for corresponding adapters that may use that syntax. The GUI controller 170 may select an adapter in this manner without receiving any other indication of which adapter to use.

In at least some embodiments, the GUI controller 170 may scan the modulator utility GUI 200 for changes that may occur. For example, the GUI controller 170 may identify changes to text, spatial locations of GUI tools, additions or removals of GUI tools, available options, etc. In at least some embodiments, the GUI controller 170 may identify a change in a version or revision number of the modulator utility GUI 200 Based on any identified change in the modulator utility GUI 200 itself or in the version or revision number, the GUI controller 170 may update the map in view of any changes made to the modulator utility GUI 200.

Modifications, additions, or omissions may be made to the example modulator utility GUI 200 without departing from the scope of the present disclosure. Specifically, embodiments of the example modulator utility GUI 200 are depicted in FIG. 2 as various enumerated GUI tools. However, the present disclosure applies to an example modulator utility GUI 200 including any number or type of GUI tools that may be used to control any aspect of a modulator at the media distribution node 105.

Figure 3:
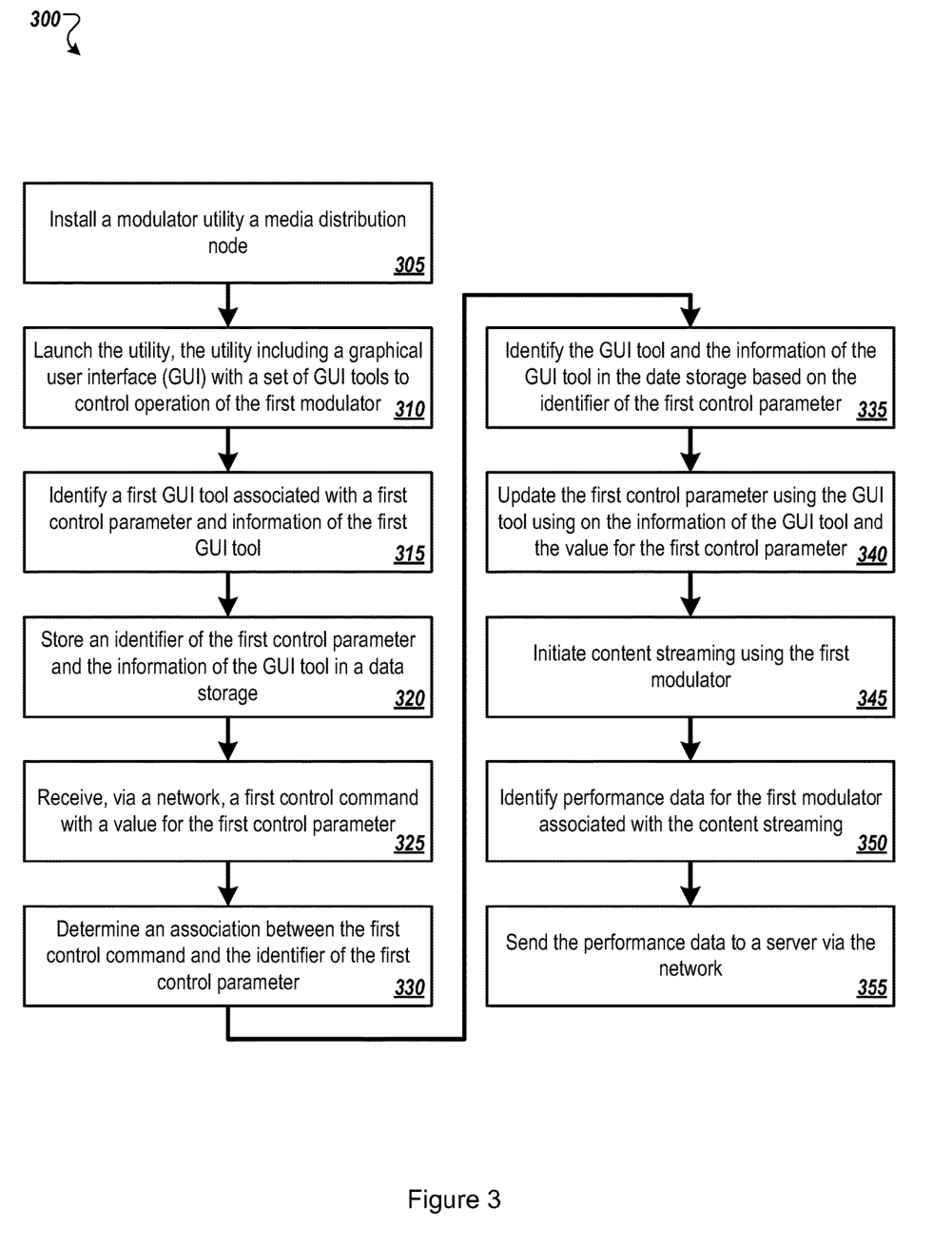
FIG. 3 illustrates an example flow diagram of a method that may be used to implement some embodiments.
Figure 4:
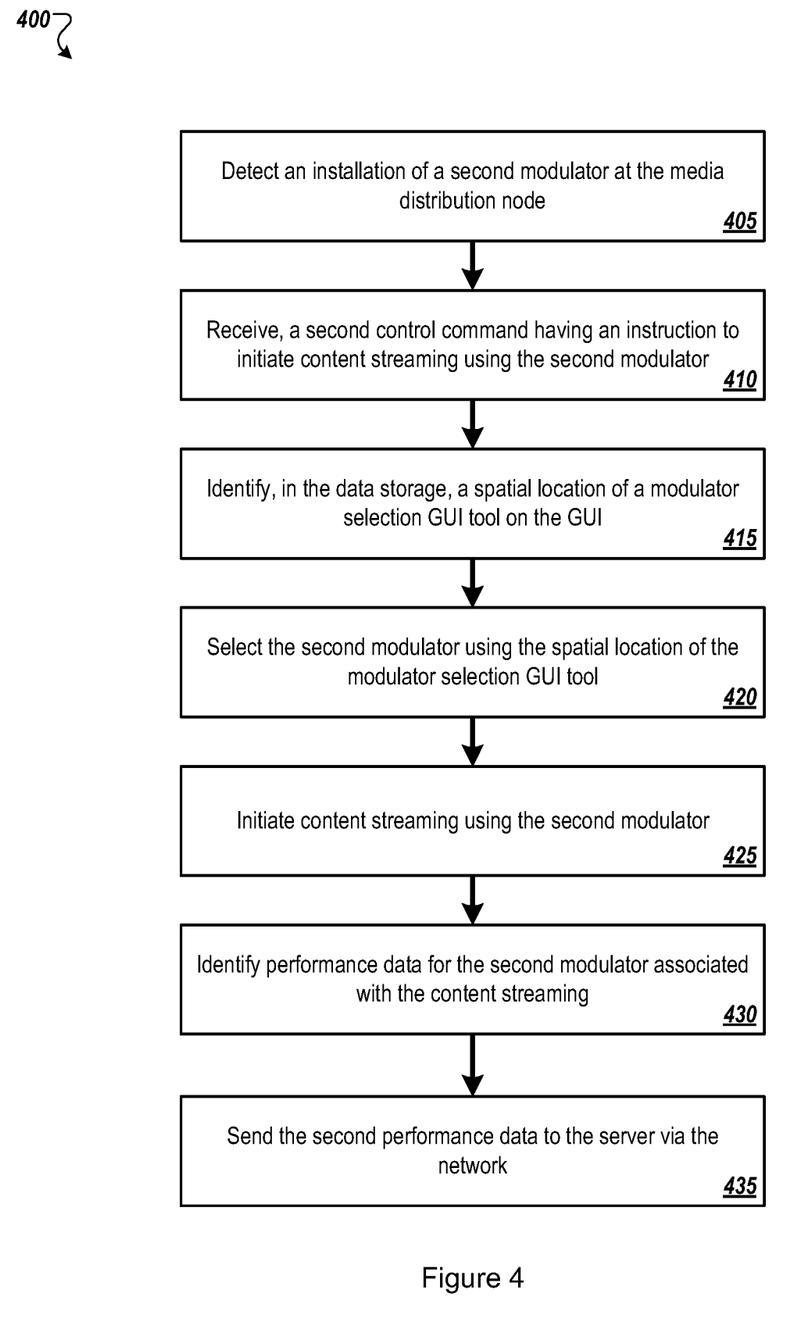
FIG. 4 illustrates another example flow diagram of a method that may be used to implement some embodiments.

FIGS. 3-4 illustrate flow diagrams of various methods related to generating a narrative-aware recommendation for a content item. The methods may be performed by processing logic that may include hardware (circuitry, dedicated logic, etc.), software (such as is run on a general purpose computer system or a dedicated machine), or a combination of both, which processing logic may be included in the media distribution node 105 of FIG. 1, or another computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 3 illustrates an example flow diagram of a method 300 to provide a net-aware service to control media distribution node output that may be implemented in the operating environment of FIG. 1, arranged in accordance with at least one embodiment described in the present disclosure.

The method 300 may begin at block 305, where processing logic may install a modulator utility at a media distribution node. The utility may include a GUI with a set of GUI tools to control operation of a first modulator. At block 310, the processing logic may launch the GUI. When launching the GUI that includes the GUI tool, the processing logic may launch a modulator utility and cause display of the GUI on a display device.

At block 315, the processing logic may identify a GUI tool associated with a first control parameter and information of the GUI tool. The information of the GUI tool may include a spatial location of the GUI tool on the GUI.

At block 320, the processing logic may store an identifier of the first control parameter and the information of the GUI tool in a data storage. The processing logic may generate the identifier of the first control parameter.

At block 325, the processing logic may receive, via a network, a first control command including a value for the first control parameter. At block 330, the processing logic may determine an association between the first control command and the identifier of the first control parameter, such as by querying a data storage to identify the association. At block 335, the processing logic may identify the GUI tool and information of the GUI tool in the data storage based on the identifier of the first control parameter. At block 340, the processing logic may update the first control parameter using the GUI tool based on the information of the GUI tool and the value for the first control parameter. The information of the GUI tool may include one or more of a spatial location of the GUI tool on the GUI, a control parameter type, and a set of selectable options associated with the GUI tool. When updating the first control parameter using the GUI tool based on the information of the GUI tool and the value for the first control parameter, the processing logic may navigate to the GUI tool based on the spatial location of the GUI tool on the GUI, and manipulate the GUI tool in view of the first control parameter.

At block 345, the processing logic may initiate content streaming using the first modulator in response to updating the first control parameter. In at least some embodiments, the processing logic may select the first modulator based on the information of the GUI tool. At block 350, the processing logic may identify performance data for the first modulator associated with the content streaming. At block 355, the processing logic may send the performance data to a server via the network.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

FIG. 4 illustrates another example flow diagram of a method 400 to control operations of two modulators at a media distribution node using a single set of control commands that may be implemented in the operating environment of FIG. 1, arranged in accordance with at least one embodiment described in the present disclosure.

The method 400 may begin at block 405, where processing logic may detect an installation of a second modulator at a media distribution node. The second modulator may be a different model than a first modulator installed at the media distribution node. At block 410, the processing logic may receive a second control command having an instruction to initiate content streaming using the second modulator. At block 415, the processing logic may identify, in a data storage, a spatial location of a modulator selection GUI tool on the GUI. At block 420, the processing logic may select the second modulator using the spatial location of the modulator selection GUI tool. At block 425, the processing logic may initiate content streaming using the second modulator. At block 430, the processing logic may identify performance data for the second modulator associated with the content streaming. At block 435, the processing logic may send the second performance data to a server via a network.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Figure 5:
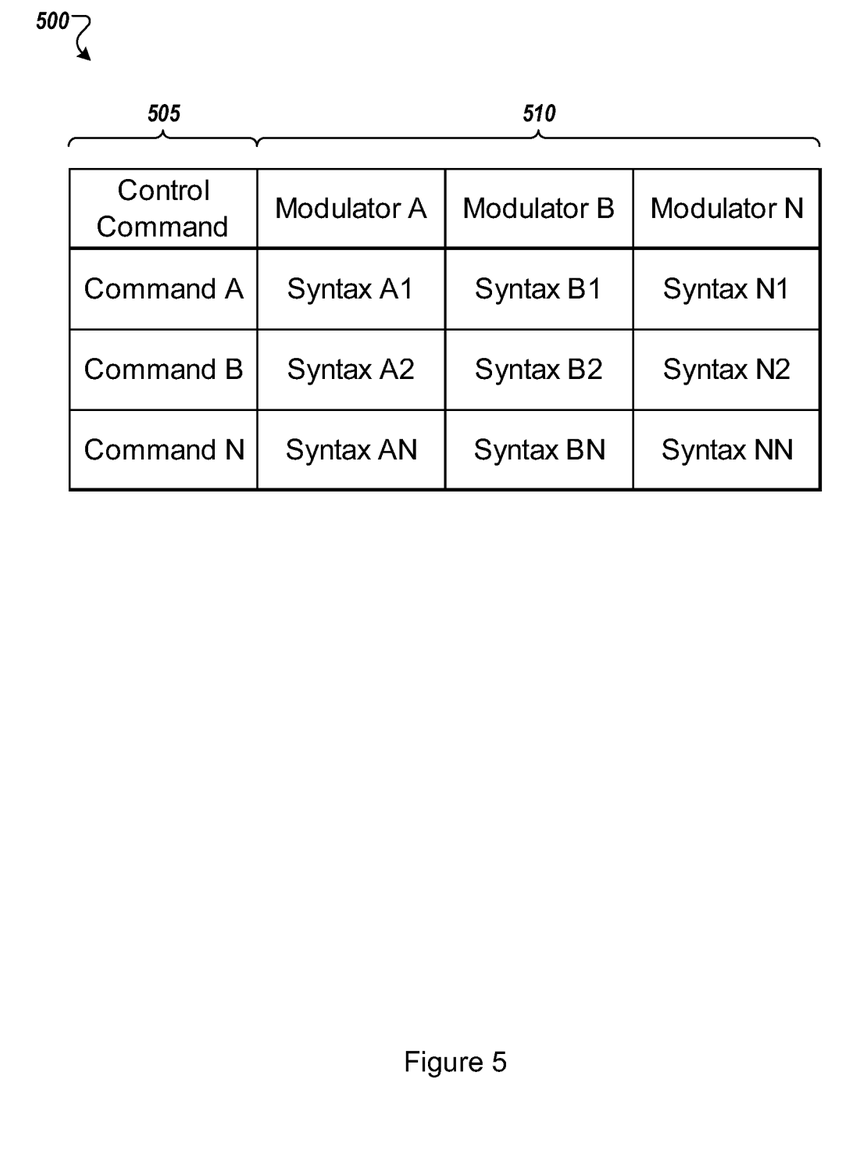
FIG. 5 illustrates a diagrammatic representation of a machine in an example form of a computing device within which a set of instructions, for causing the machine to perform any one or more of the methods discussed herein, may be executed.

FIG. 5 illustrates an example translation table 500 between syntax of one or more control commands 505 and one or more control parameters 510. The one or more control commands 505 may be part of a set of control commands that may be universally used to adjust control parameters for different modulators of different make, model, or type.

Any number of control commands and their respective syntaxes (illustrated as "Command N") may be included in the translation table 500. As illustrated, the translation table 500 includes Command A, Command B, and Command N. Any number of modulators (illustrated as "Modulator N") and their respective syntaxes (illustrated as "Syntax N1") may be included in the translation table 500. As illustrated, the translation table 500 includes Modulator A, Modulator B, and Modulator N.

The example translation table 500 may provide a relationship between the control command A and the control parameter for modulator A. The control commands may correspond to different syntaxes for the different modulators. For example, a control command A may correspond to a control parameter with syntax A1 for modulator A. The syntax for the control command A may differ from the syntax A1 for the corresponding control parameter for modulator A.

In an example, a control command A 505 may include a command to set a Modulation Parameter to DVB-C. The syntax for the control command A may, for example, be "Modulation Parameter." The syntax to perform the same or similar function for modulator A may be the same or different as the syntax of control command A. Similarly, the syntax to perform the same or similar function for the modulator B may be the same or different as the syntax of the control command A. For example, to adjust the stream output to be in a DVB-C format, the syntax of control command A may include an adjustment to a "Modulation Parameter." To adjust the stream output to be in a DVB-C format, the syntax A1 for the modulator A and/or the syntax B1 for the modulator B may be "TS Output Control."

Figure 6:
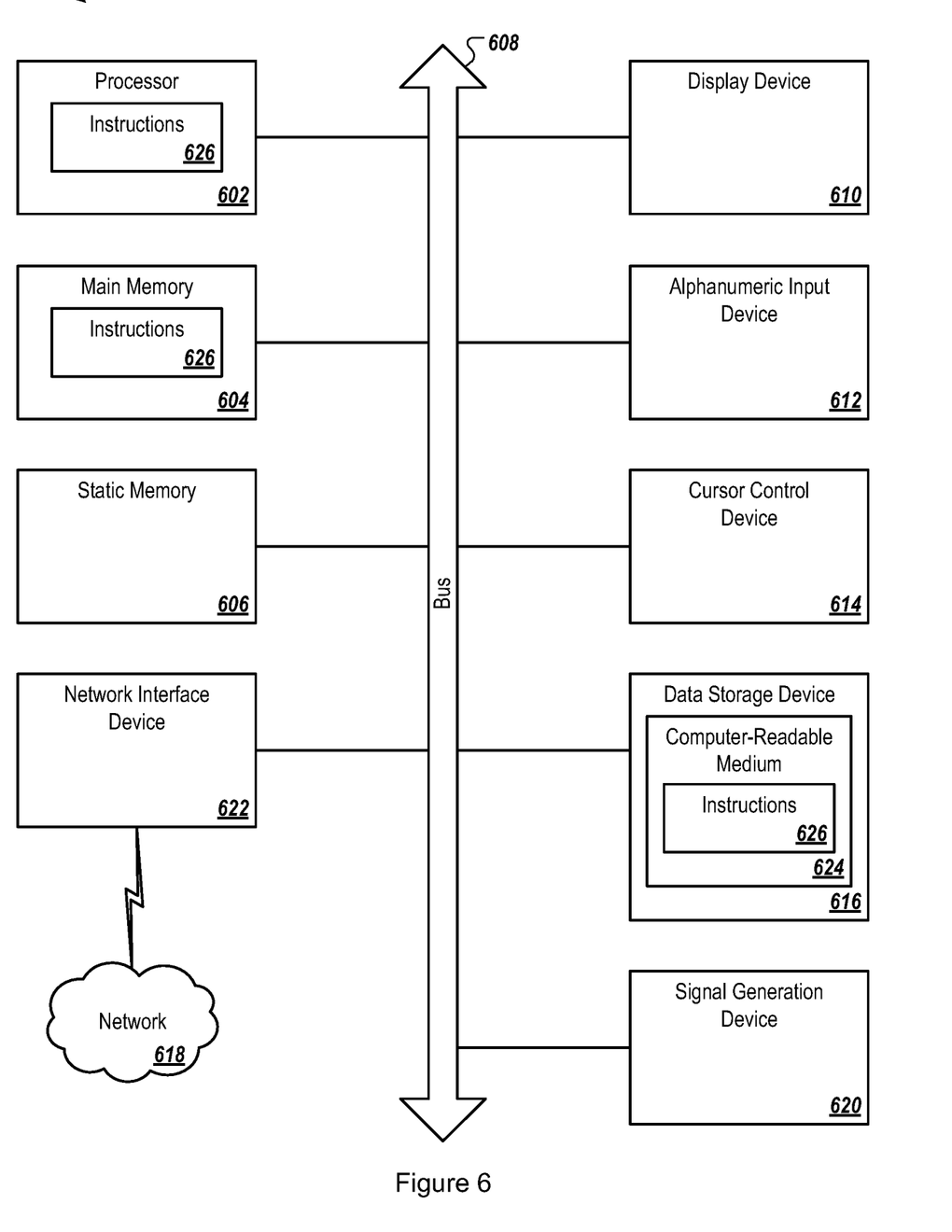
FIG. 6 illustrates a diagrammatic representation of a machine in the example form of a computing device within which a set of instructions, for causing the machine to perform any one or more of the methods discussed herein, may be executed.

FIG. 6 illustrates a diagrammatic representation of a machine in the example form of a computing device 600 within which a set of instructions, for causing the machine to perform any one or more of the methods discussed herein, may be executed. The computing device 600 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in a client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 616, which communicate with each other via a bus 608.

Processing device 602 represents one or more general-purpose processing devices such as a microprocessor, central processing unit, or the like. More particularly, the processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also include one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computing device 600 may further include a network interface device 622 which may communicate with a network 618. The computing device 600 also may include a display device 610 (e.g., a liquid crystal display (LCD) or a cathode ray tube (CRT)), an alphanumeric input device 612 (e.g., a keyboard), a cursor control device 614 (e.g., a mouse) and a signal generation device 620 (e.g., a speaker). In one implementation, the display device 610, the alphanumeric input device 612, and the cursor control device 614 may be combined into a single component or device (e.g., an LCD touch screen).

The data storage device 616 may include a computer-readable storage medium 624 on which is stored one or more sets of instructions 626 embodying any one or more of the methods or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 618 via the network interface device 622.

While the computer-readable storage medium 624 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In one aspect, a system includes a memory. The system further includes a first modulator. The system further includes one or more processors operatively coupled to the memory and the first modulator, the one or more processors being configured to execute operations to receive, via a network, a first control command that includes a value for a first control parameter. The one or more processors being configured to execute further operations to determine an association between the first control command and an identifier of the first control parameter. The one or more processors being configured to execute further operations to identify a graphical user interface (GUI) tool and information of the GUI tool in a data storage based on the identifier of the first control parameter. The one or more processors being configured to execute further operations to launch a GUI that includes the GUI tool. The one or more processors being configured to execute further operations to update the first control parameter using the GUI tool based on the information of the GUI tool and the value for the first control parameter. The one or more processors being configured to execute further operations to initiate content streaming using the first modulator in response to updating the first control parameter. The one or more processors being configured to execute further operations to identify performance data for the first modulator associated with the content streaming. The one or more processors being configured to execute further operations to send the performance data to a server via the network.

Implementations can include any, all, or none of the following features. The information of the GUI tool can include a spatial location of the GUI tool on the GUI. When updating the first control parameter using the GUI tool based on the information of the GUI tool and the value for the first control parameter, the one or more processors can be configured to navigate to the GUI tool based on the spatial location of the GUI tool on the GUI, and manipulate the GUI tool in view of the first control parameter. The one or more processors can be configured to install a utility for a first modulator at a media distribution node. The utility can include the GUI with a set of GUI tools to control operation of the first modulator. The one or more processors can be configured to identify a GUI tool of the set of GUI tools associated with the first control parameter and information of the GUI tool can include a spatial location of the GUI tool on the GUI. The one or more processors can be configured to store an identifier of the first control parameter and the information of the GUI tool in a data storage. The information of the GUI tool can include a control parameter type and a set of selectable options associated with the GUI tool. The one or more processors can be configured to detect an installation of a second modulator at a media distribution node. The second modulator can be a different model than the first modulator. The one or more processors can be configured to receive, a second control command having an instruction to initiate content streaming using the second modulator. The one or more processors can be configured to identify, in a data storage, a spatial location of a modulator selection GUI tool on the GUI. The one or more processors can be configured to select the second modulator using the spatial location of the modulator selection GUI tool. The one or more processors can be configured to initiate content streaming using the second modulator. The GUI can be part of a modulator utility. When launching the GUI that can include the GUI tool, the one or more processors can be configured to launch the utility and cause display of the GUI on a display device. The one or more processors can be configured to select the first modulator based on the information of the GUI tool.

In one aspect, a non-transitory computer-readable medium having encoded therein programming code executable by one or more processors to perform or control performance of operations to receive, via a network, a first control command includes a value for a first control parameter, determine an association between the first control command and an identifier of the first control parameter, identify a graphical user interface (GUI) tool and information of the GUI tool in a data storage based on the identifier of the first control parameter, launch a GUI that includes the GUI tool, update the first control parameter using the GUI tool based on the information of the GUI tool and the value for the first control parameter, initiate content streaming using a first modulator in response to updating the first control parameter, identify performance data for the first modulator associated with the content streaming, and send the performance data to a server via the network.

Implementations can include any, all, or none of the following features. The information of the GUI tool can include a spatial location of the GUI tool on the GUI. The operation to update the first control parameter using the GUI tool based on the information of the GUI tool and the value for the first control parameter can include operations to navigate to the GUI tool based on the spatial location of the GUI tool on the GUI, and manipulate the GUI tool in view of the first control parameter. The operations can include an operation to install a utility for a first modulator at a media distribution node. The utility can include the GUI with a set of GUI tools to control operation of the first modulator. The operations can include an operation to identify a GUI tool of the set of GUI tools associated with the first control parameter and information of the GUI tool can include a spatial location of the GUI tool on the GUI. The operations can include an operation to store an identifier of the first control parameter and the information of the GUI tool in a data storage. The information of the GUI tool can include a control parameter type and a set of selectable options associated with the GUI tool. The operations can include an operation to include detect an installation of a second modulator at a media distribution node. The second modulator can be a different model than the first modulator. The operations can include an operation to receive, a second control command having an instruction to initiate content streaming using the second modulator. The operations can include an operation to identify, in a data storage, a spatial location of a modulator selection GUI tool on the GUI. The operations can include an operation to select the second modulator using the spatial location of the modulator selection GUI tool. The operations can include an operation to initiate content streaming using the second modulator. The GUI can be part of a modulator utility. The operation to launch the GUI that includes the GUI tool can include an operation to launch the utility and cause display of the GUI on a display device. The operations can include an operation to select the first modulator based on the information of the GUI tool.

In one aspect, a method includes receiving, via a network, a first control command includes a value for a first control parameter. The method further includes determining an association between the first control command and an identifier of the first control parameter. The method further includes identifying a graphical user interface (GUI) tool and information of the GUI tool in a data storage based on the identifier of the first control parameter. The method further includes launching a GUI that includes the GUI tool. The method further includes updating the first control parameter using the GUI tool based on the information of the GUI tool and the value for the first control parameter. The method further includes initiating content streaming using a first modulator in response to updating the first control parameter. The method further includes identifying performance data for the first modulator associated with the content streaming. The method further includes sending the performance data to a server via the network.

Implementations can include any, all, or none of the following features. The information of the GUI tool can include a spatial location of the GUI tool on the GUI. Updating the first control parameter using the GUI tool based on the information of the GUI tool and the value for the first control parameter can include navigating to the GUI tool based on the spatial location of the GUI tool on the GUI, and manipulating the GUI tool in view of the first control parameter. The method can include installing a utility for a first modulator at a media distribution node. The utility can include the GUI with a set of GUI tools to control operation of the first modulator. The method can further include identifying a GUI tool of the set of GUI tools associated with the first control parameter and information of the GUI tool can include a spatial location of the GUI tool on the GUI. The method can further include storing an identifier of the first control parameter and the information of the GUI tool in a data storage. The method can include detecting an installation of a second modulator at a media distribution node. The second modulator can be a different model than the first modulator. The method can further include receiving, a second control command having an instruction to initiate content streaming using the second modulator. The method can further include identifying, in a data storage, a spatial location of a modulator selection GUI tool on the GUI. The method can further include selecting the second modulator using the spatial location of the modulator selection GUI tool. The method can further include initiating content streaming using the second modulator. The GUI can be part of a modulator utility. Launching the GUI that can include the GUI tool can include launching the utility and causing display of the GUI on a display device. The method can include selecting the first modulator based on the information of the GUI tool.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A system, comprising:
   a memory;
   a first modulator; and
   one or more processors operatively coupled to the memory and the first modulator, the one or more processors being configured to execute operations comprising:
   receive, via a network, a first control command including a value for a first control parameter;
   identify a translation tool and first data associated with the translation tool in a data storage, wherein the first data includes a first spatial location in a graphical user interface of the first modulator, the first spatial location associated with the first control command;
   based on the first spatial location that is included in the first data and the value of the first control parameter, use the translation tool to manipulate a cursor in the graphical user interface of the first modulator to generate a second control parameter;
   provide the second control parameter to the first modulator;
   initiate content streaming using the first modulator;

identify performance data for the first modulator associated with the content streaming; and
send the performance data to a server via the network.

2. The system of claim 1, wherein when generating the second control parameter using the translation tool based on the first spatial location and the value for the first control parameter, the one or more processors configures the translation tool based on the first spatial location, and manipulates the translation tool to generate the second control parameter in view of the first control parameter.

3. The system of claim 1, the one or more processors being configured to execute further operations comprising:
install a utility for the first modulator at a media distribution node, the utility including a set of tools to control operation of the first modulator;
identify the translation tool from the set of tools and first data; and
store the first data in the data storage.

4. The system of claim 1, wherein the first data includes a control parameter type and a set of selectable options associated with the translation tool.

5. The system of claim 1, the one or more processors being configured to execute further operations comprising:
detect an installation of a second modulator at a media distribution node, wherein the second modulator is a different model than the first modulator;
receive a third control command having an instruction to initiate content streaming using the second modulator;
identify, in the data storage, a second spatial location of a modulator selection tool in the graphical user interface;
select the second modulator using the second spatial location of the modulator selection tool; and
initiate content streaming using the second modulator.

6. The system of claim 1, wherein when launching the translation tool, the one or more processors are configured to launch a modulator utility and cause display of the graphical user interface on a display device.

7. The system of claim 1, the one or more processors being configured to execute further operations to select the first modulator based on the first data.

8. A non-transitory computer-readable medium having encoded therein programming code executable by one or more processors to perform or control performance of operations comprising:
receive, via a network, a first control command including a value for a first control parameter;
identify a translation tool and first data associated with the translation tool in a data storage, wherein the first data includes a first spatial location in a graphical user interface of a first modulator, the first spatial location associated with the first control command;
based on the first spatial location that is included in the first data and the value of the first control parameter, use the translation tool to manipulate a cursor in the graphical user interface of the first modulator to generation a second control parameter;
initiate content streaming using the first modulator;
identify performance data for the first modulator associated with the content streaming; and
send the performance data to a server via the network.

9. The non-transitory computer-readable medium of claim 8, wherein generating the second control parameter using the translation tool based on the first spatial location and the value for the first control parameter includes configuring the translation tool based on the first spatial location, and manipulating the translation tool to generate the second control parameter in view of the first control parameter.

10. The non-transitory computer-readable medium of claim 8, the programming code executable by the one or more processors to perform or control performance of further operations comprising:
install a utility for the first modulator at a media distribution node, the utility including a set of tools to control operation of the first modulator;
identify the translation tool from the set of tools and first data; and
store the first data in the data storage.

11. The non-transitory computer-readable medium of claim 8, wherein the first data includes a control parameter type and a set of selectable options associated with the translation tool.

12. The non-transitory computer-readable medium of claim 8, the programming code executable by the one or more processors to perform or control performance of further operations comprising:
detect an installation of a second modulator at a media distribution node, wherein the second modulator is a different model than the first modulator;
receive a third control command having an instruction to initiate content streaming using the second modulator;
identify, in the data storage, a second spatial location of a modulator selection tool in the graphical user interface;
select the second modulator using the second spatial location of the modulator selection tool; and
initiate content streaming using the second modulator.

13. The non-transitory computer-readable medium of claim 8, wherein the operation to launch the translation tool includes an operation to launch a modulator utility and cause display of the graphical user interface on a display device.

14. The non-transitory computer-readable medium of claim 8, the programming code executable by the one or more processors to perform or control performance of further operations to select the first modulator based on the first data.

15. A method, comprising:
receiving, via a network, a first control command including a value for a first control parameter;
identifying a translation tool and first data associated with the translation tool in a data storage, wherein the first data includes a first spatial location in a graphical user interface of a first modulator, the first spatial location associated with the first control command;
based on the first spatial location that is included in the first data and the value of the first control parameter, using the translation tool to manipulate a cursor in the graphical user interface of the first modulator to generate a second control parameter;
providing the second control parameter to the first modulator;
initiating content streaming using the first modulator;
identifying performance data for the first modulator associated with the content streaming; and
sending the performance data to a server via the network.

16. The method of claim 15, wherein generating the second control parameter using the translation tool based on the first spatial location and the value for the first control parameter comprises configuring the translation tool based on the first spatial location, and manipulating the translation tool to generate the second control parameter in view of the first control parameter.

17. The method of claim 15 further comprising:
installing a utility for the first modulator at a media distribution node, the utility including a set of tools to control operation of the first modulator;

identifying the translation tool from the set of tools and first data; and storing the first data in the data storage.

18. The method of claim 15 further comprising:

detecting an installation of a second modulator at a media distribution node, wherein the second modulator is a different model than the first modulator;

receiving a third control command having an instruction to initiate content streaming using the second modulator;

identifying, in the data storage, a second spatial location of a modulator selection tool in the graphical user interface;

selecting the second modulator using the second spatial location of the modulator selection tool; and initiating content streaming using the second modulator.

19. The method of claim 15, wherein launching the translation tool comprises launching a modulator utility and causing display of the graphical user interface on a display device.

20. The method of claim 15, further comprising selecting the first modulator based on the first data.

\* \* \* \* \*